(12) United States Patent
Bartolo et al.

(10) Patent No.: US 8,938,951 B2
(45) Date of Patent: Jan. 27, 2015

(54) DEVICE FOR STORING AND SUPPLYING AMMONIA AND EXHAUST LINE EQUIPPED WITH SUCH A DEVICE

(71) Applicant: Faurecia Systemes D'Echappement, Nanterre (FR)

(72) Inventors: Xavier Bartolo, Bois le Roi (FR); David Gafforelli, Audincourt (FR)

(73) Assignee: Faurecia Systemes D'Echappement, Nanterre (FR)

( * ) Notice: Subject to any disclaimer, the term of this patent is extended or adjusted under 35 U.S.C. 154(b) by 58 days.

(21) Appl. No.: 13/908,315

(22) Filed: Jun. 3, 2013

(65) Prior Publication Data

US 2013/0327027 A1    Dec. 12, 2013

(30) Foreign Application Priority Data

Jun. 6, 2012   (FR) ...................................... 12 55281

(51) Int. Cl.
*F01N 3/00*   (2006.01)
*F01N 3/20*   (2006.01)

(52) U.S. Cl.
CPC .............. *F01N 3/208* (2013.01); *F01N 3/2066* (2013.01); *F01N 2610/02* (2013.01); *F01N 2610/06* (2013.01); *F01N 2610/10* (2013.01); *F01N 2610/1406* (2013.01); *F01N 2900/1808* (2013.01); *Y02T 10/24* (2013.01)
USPC .............................. 60/295; 60/299; 423/239.1

(58) Field of Classification Search
CPC ... F01N 3/2066; F01N 3/208; F01N 2610/02; F01N 2610/06; F01N 2610/1406; F01N 2900/1808; F01N 2610/10; Y02T 10/24
See application file for complete search history.

(56) References Cited

U.S. PATENT DOCUMENTS

| | | | |
|---|---|---|---|
| 7,964,163 | B2 * | 6/2011 | Johannessen et al. ........ 422/601 |
| 2006/0117741 | A1 * | 6/2006 | Mayer et al. .................. 60/286 |
| 2008/0066453 | A1 * | 3/2008 | Oberski et al. ................. 60/286 |
| 2009/0123361 | A1 * | 5/2009 | Johannessen et al. ........ 423/352 |
| 2009/0280047 | A1 * | 11/2009 | Christensen et al. ...... 423/239.1 |
| 2013/0230443 | A1 * | 9/2013 | Christensen et al. ...... 423/239.1 |

FOREIGN PATENT DOCUMENTS

| | | |
|---|---|---|
| EP | 2366448 A1 | 9/2011 |
| FR | 2957630 A1 | 9/2011 |
| WO | 2006081824 A2 | 8/2006 |

OTHER PUBLICATIONS

FR Search report from corresponding FR 12 55281, filed Jun. 6, 2012.

* cited by examiner

*Primary Examiner* — Jesse Bogue
(74) *Attorney, Agent, or Firm* — Carlson, Gaskey & Olds, PC (57) ABSTRACT

A device for storing and supplying ammonia to an exhaust line of an automobile vehicle, includes a solid material provided for absorbing the ammonia, a reservoir for storing the solid material, and a heating unit to heat the solid material to desorb the ammonia. The solid material comprises solid elements with a mass of less than 50 grams. The heating unit is insulated from the reservoir. The device also includes a first assembly for transferring solid elements from the reservoir to the heating unit.

18 Claims, 4 Drawing Sheets

DEVICE FOR STORING AND SUPPLYING AMMONIA AND EXHAUST LINE EQUIPPED WITH SUCH A DEVICE

TECHNICAL FIELD

The invention generally relates to devices for storing and supplying ammonia for exhaust lines of automobile vehicles. More specifically, the invention according to a first aspect relates to a device for storing and supplying ammonia for an exhaust line of an automobile vehicle, of the type comprising:
- a solid material provided for absorbing ammonia, the solid material comprising solid elements with masses of less than 50 grams;
- a reservoir for storing solid material;
- a heating unit provided to heat the solid material to desorb ammonia, the heating unit being separate from the reservoir; and
- a first assembly to transfer solid elements from the reservoir to the heating unit.

BACKGROUND

Such a device is for example known from WO2006/081824. This document does not specifically describe how to handle the replacement of the depleted solid elements.

In this context, the invention is directed to proposing a device for storing and supplying ammonia, which solves this problem.

SUMMARY

A storage and supply device of the aforementioned type, includes a supply conduit connecting the heating unit to the exhaust line, a probe for measuring the pressure in the conduit, and a computer. The computer is programmed to control a discharge of one or more depleted solid elements from the heating unit as far as a storage area and a transfer of one or several other solid elements from the reservoir as far as the heating unit, depending on the ammonia pressure in the supply conduit.

Thus, ammonia gas desorbed from the solid material in the heating unit is transferred through the supply conduit as far as into the exhaust line. Practically all the ammonia gas stored in these solid elements is immediately desorbed after being loaded in the heating unit. The pressure in the supply conduit is then high. This pressure then decreases over time, gradually as the ammonia is injected into the exhaust line. When the pressure attains a lower limit value, the computer controls the discharge of the depleted solid elements out of the heating unit.

Thus, the heating unit is not provided for heating the contents of the reservoir. The design of the reservoir may thus be considerably simplified, since this reservoir and the solid material which it contains are constantly at room temperature.

The fact that the solid material appears as solid elements of low mass, gives the possibility of carrying out conveniently the transfer of these elements, gradually from the reservoir as far as the heating unit. Accordingly, the heating unit may be dimensioned for only heating a small mass of solid material. The heating unit is thus a low power unit and the energy consumption of this heating unit is reduced.

In the state of the art, the solid material appears in the form of blocks of large size and mass, which are not intended to be transferred out of the storage reservoir. The blocks are provided for permanently remaining in the reservoir, during the whole lifetime of the latter, or are only extracted from the reservoir at the moment when the latter is reloaded with ammonia.

The device is provided for supplying the exhaust line with ammonia gas. The injection point is located upstream from a selective catalytic reduction (SCR) member.

The solid material is provided for absorbing the ammonia gas and thereby allowing its storage in solid form. By absorption is meant all the phenomena known under the name of absorption, of adsorption or complexation. The reactions of ammonia absorption by the solid material occur at a low temperature, these temperatures being specific for each type of solid material. These reactions are reversible, the ammonia desorbing from the solid material at high temperatures. Thus, in the heating unit, the solid material is brought to high temperatures, which causes desorption of ammonia gas.

The solid material appears in the form of solid elements of small sizes, which may have all sorts of shapes. The solid elements may be tablets, blocks of small sizes, balls, pellets, gravels, granules, may appear as a powder, etc. As indicated above, the solid material in majority appears in the form of solid elements with masses of less than 50 grams, preferably in an amount of at least 75%, still preferably at least 90%, and typically entirely in this form. The solid elements preferably each have a mass of less than 50 grams, still preferably a mass of less than 15 grams and still preferably a mass of less than 5 grams. Typically, they have a mass of the order of 3 grams. The mass considered here is the mass of the solid material saturated with $NH_3$.

The heating unit is separate from the reservoir, in the sense that it is not integrated into the volume of the reservoir where the solid elements are stored. The intended goal is that the heat released by the heating unit is not transmitted to the solid elements stored in the reservoir. Thus, when the heating unit is operating, ammonia does not de-gas from the solid element stored in the reservoir, and the pressure in the reservoir never exceeds ambient pressure.

Preferably, the heating unit and the reservoir are entirely distinct from each other. In other words, the heating unit and the reservoir are not accommodated in a common enclosure. On the other hand, the heating unit and the reservoir are mechanically linked to each other. In a non-preferred alternative, the heating unit is accommodated in the reservoir. In this case, thermal insulation is provided around the heating unit in order to avoid transmission of heat to as far as the solid materials stored in the reservoir.

The first transfer assembly is, for example, of the type known under the name of a worm screw or an Archimedes screw. Such an assembly is well adapted for the transfer of solid elements of low masses. Alternatively, the first transfer assembly is a conveyor, or a pneumatic transfer device, or a transfer device by gravity, or is of any other suitable type.

The heating unit is preferably laid out for heating a mass of solid elements of less than 30 grams.

As earlier, the mass corresponds here to the mass of solid elements by taking into account the absorbed ammonia molecules. Thus, the heating unit is of small size and the consumed power is reduced. The heating unit, because it only treats a low mass, may ensure a fast rise in temperature of the solid elements and almost immediate release of the ammonia. The heating unit is adapted for heating only one solid element at a time, or for heating several solid elements at a time, depending on the individual weight of each solid element. The mass of heated solid elements is selected to allow continuous supply of the exhaust line for a period of several minutes. For example, the mass of solid elements is comprised between 1 gram and 50 grams, preferably between 2 and 15 grams and typically comprised between 3 and 5 grams of solid elements.

Thus, in the case of a leak towards the outside of the device, the maximum amount of released ammonia is low, and remains below the limit which may cause serious consequences on the health of persons located around the device.

Preferably, the area for storing the depleted solid elements is located in the reservoir, as described later on. Alternatively, the storage area is a second reservoir, different from the reservoir for storing the solid elements loaded with ammonia.

Preferably, the device comprises a buffer reservoir fluidically connected to the supply conduit.

The buffer reservoir is used for storing the ammonia gas desorbed by the solid elements. It is particularly useful, because the ammonia gas is desorbed very rapidly after loading the heating unit.

The heating unit preferably comprises an enclosure provided for receiving one or several solid elements and a heating member by conduction, for example an electric resistor.

The enclosure has an inlet for the solid elements transferred via the first transfer assembly from the reservoir, and an outlet for discharging the depleted solid elements. This inlet and this outlet are normally closed during the heating of the solid elements. The enclosure fluidically communicates with the supply conduit. Alternative, an anti-return valve allows insulation of the enclosure of the supply conduit. According to another alternative, the valve is replaced by a solenoid valve. The latter is controlled by the computer. It is open when the solid elements are being heated and the ammonia desorbed. It is closed for the remainder of the time in order to retain the ammonia in the conduit.

The enclosure is thermally insulated to limit the heat losses towards the outside.

Preferably, the heating unit comprises a metal member positioned in the enclosure and in contact with which are placed the solid element(s), the heating member being an electric resistor laid out for heating the metal member. Thus, the heating member heats by conduction the metal member, this metal member heating by conduction the solid element(s).

Typically, the metal member is a tube in which the solid element(s) are received. The heating member is placed in the enclosure. Alternatively, the heating member is a member heating with waves, for example an inducting member or heating with microwaves, or via other types of waves. This member may be placed in the enclosure or outside the enclosure.

Induction heating is particularly well adapted in the present case, since it reduces the mass to be heated. Such a heating method is particularly well adapted for small amounts of solid elements. Moreover, it allows reduction in thermal losses, for example occurring via the electric power supply of the heating resisters.

Advantageously, the reservoir comprises first and second areas sealably separated from each other, ammonia-loaded solid elements being stored in the first area, ammonia-depleted solid elements being stored in the second area, the first transfer assembly being laid out for transferring solid elements from the first area to the heating unit, the device comprising a second transfer assembly laid out for transferring solid elements from the heating unit as far as the second area.

Thus, the same reservoir is both used for storing fresh ammonia-loaded solid elements and for storing depleted solid elements. This allows an increase in the compactness of the storage and supply device. This is also particularly economical.

The second transfer assembly is preferably of the same type as the first. For example, the second transfer assembly is a worm screw. Alternatively, this second transfer assembly is a pneumatic transfer assembly, or a conveyor belt, or a transfer assembly by gravity, etc.

Preferably, the enclosure comprises a deformable wall separating the first and second areas from each other. Thus, the volumes allocated to the storage of the fresh solid elements and of the depleted solid elements, respectively, may vary over time. They may notably vary gradually as the ammonia-loaded solid elements are transferred towards the heating unit, and as the depleted solid elements are transferred from the heating unit to the enclosure. Thus, just after reloading the reservoir, the first area occupies a relatively large volume of the enclosure and the second area a relatively smaller volume. Just before reloading, the first area occupies a relatively small volume and the second area a relatively larger volume.

Advantageously, the enclosure comprises a safety valve provided for putting the first and second areas in communication with each other when the first area has a determined overpressure relatively to the second area. This overpressure is typically comprised between 10 mbars and 500 mbars.

Thus, if an ammonia leak from the heating unit occurs, or if the enclosure is accidentally heated to a temperature causing desorption of the ammonia, the safety valve gives the possibility of discharging the ammonia towards the second area. In this second area, at least one portion of the ammonia gas is absorbed in the depleted solid elements. Moreover, this gives the possibility of decreasing the ammonia pressure inside the reservoir, by distributing the ammonia gas in a larger volume. Thus, this allows the pressure to be maintained below the limit which may be supported by the reservoir. The risk of an ammonia discharge outside the reservoir is extremely limited.

Preferably, the enclosure comprises an orifice provided for reloading the first area with solid elements.

This orifice is typically sealably closed by a plug. The plug is withdrawn when it is intended to reload the reservoir with solid elements. Because, the solid elements are in small sizes, the reloading orifice is also of a small size.

The reloading may occur without it being necessary to disassemble the reservoir of the vehicle.

Further, the reservoir comprises an orifice provided for discharging the depleted solid elements out of the second area. As earlier, this orifice is normally sealably obturated by a plug which may be disassembled. The discharge orifice, like the reloading orifice, is of a small size. The discharge of the depleted solid elements may be achieved without having to disassemble the reservoir of the automobile vehicle. The discharge is, for example, carried out by gravity and/or by using a suction device.

Preferably, the reservoir is made in a plastic material.

For example, the reservoir is made in polyethylene or in polypropylene. Because the reservoir is not heated and is never pressurized, it may be made in a particularly economical way, for example, by injection. It may have all sorts of shapes, because of the absence of heating members. This is particularly advantageous for the integration of this reservoir onboard the automobile vehicle.

Typically, the solid elements are salts selected from $MgCl_2$, $CaCl_2$ and $BaCl_2$. Preferably the solid elements are in $MgCl_2$.

The materials are particularly advantageous since, at a room temperature of 20° C., they do not practically desorb any $NH_3$. Thus at 20° C., inside the reservoir, the $NH_3$ partial pressure is extremely low so that the risk of releasing $NH_3$ outside the reservoir is very limited. Thus, it is not necessary to provide extremely sophisticated gas proof systems for the orifices of the reservoir, which is economical. As the pressure inside the reservoir is low, the latter does not have to be dimensioned for withstanding high pressures.

Each $MgCl_2$ molecule in the ammonia-saturated condition, may absorb six $NH_3$ molecules, its formula then being $MgCl_2(NH_3)_6$. Each of the six $NH_3$ molecules is desorbed at increasing determined temperatures. The last $NH_3$ molecule is desorbed at a temperature close to 420° C. When a large mass of solid materials is heated, like in the state of that art, it is not possible to bring the solid material to a sufficient temperature for desorbing the six $NH_3$ molecules. On the contrary, in the invention, the heating unit is provided for only heating a small mass of solid material so that it is possible to bring this material to a much higher temperature. It is thus possible to desorb the six $NH_3$ molecules. This therefore allows reduction in the mass of onboard solid material, for a given resupply frequency.

According to a second aspect, the invention deals with an exhaust line of automobile vehicles, comprising a conduit of exhausts, and with a device for storing and supplying the conduit of exhausts with ammonia having the above features.

The vehicle may be a car, a truck, a train or any other type of automobile vehicle.

Typically, the exhaust line is equipped with a selective catalytic purification member (selective catalytic reduction (SCR)). The storage and supply device injects the ammonia gas upstream from the catalytic purification member, along the circulation direction of the exhaust gases in the exhaust line. Alternatively, the exhaust line is equipped with another type of catalyst.

According to the third aspect, the invention deals with a method for supplying an exhaust line with ammonia by a storage and supply device having the above features, the method comprising the following steps:

transferring one or several solid elements from the reservoir into the heating unit;

heating the solid element(s) and directing the desorbed ammonia towards the exhaust line:

discharging the solid element(s) out of the heating unit when the solid element(s) is(are) at least partly depleted; and transferring one or several other solid elements from the reservoir into the heating unit.

Thus, in the above method, the solid elements are successively heated, in little amounts, in the heating unit.

Typically, the method comprises a step for measuring the ammonia pressure feeding the exhaust line, the other solid element(s) being loaded in the heating unit when the ammonia pressure is less than a pre-determined limit.

Thus, a sufficient ammonia pressure is always maintained in the supply conduit of the exhaust line. The control according to the pressure is simple and reliable.

The predetermined limit is for example comprised between 1 and 3 bars, for example comprised between 1.2 and 2 bars, and for example has the value of 1.5 bars. The bars here are absolute bars.

Alternatively, the discharge of the depleted solid element(s) out of the heating unit, and the loading of new solid element(s) may either be controlled or not according to the ammonia pressure in the supply conduit, but for example after a pre-determined heating time.

According to a fourth aspect, the invention relates to a method for maintaining the storage and supply device having the above features, in which the reservoir is rigidly attached to an automobile vehicle, solid elements loaded with ammonia are being introduced into the reservoir while the reservoir is rigidly attached to the automobile vehicle.

Thus, because the solid elements are of small sizes, it is possible to resupply the reservoir with solid elements without disassembling this reservoir of the vehicle. This maintenance operation may be carried out at a service station, at a garage, or even may be carried out by the driver himself/herself.

Advantageously, the reservoir comprises first and second areas sealably separated from each other, ammonia-loaded solid elements being stored in the first area, ammonia-depleted solid elements being stored in the second area, the method comprising a step for introducing solid elements loaded with ammonia into the first area through a reloading orifice made in the reservoir and a step for discharging depleted solid elements out of the second area through a discharge orifice made in the reservoir, both steps being carried out while the reservoir is rigidly attached to the automobile vehicle.

The maintenance of the device is thus considerably simplified.

Advantageously, the introduction step and the discharge step are carried out pneumatically, by putting the first and second areas in communication with each other and by connecting a depressurizing member at the discharge orifice.

The first and second areas may be put into communication via the overpressure valve provided in the wall separating the first and second areas from each other.

The depressurizing member is, for example, a suction device, a vacuum pump, or any other suitable member. This member draws in the depleted solid elements out of the reservoir.

This method is particularly advantageous since the depleted solid elements after heating, are embrittled and tend to be divided into fine particles. They are therefore particularly lightweight and easy to draw in.

The depressurizing member generates circulation of air from the reloading orifice, through the overpressure valve and through the discharge orifice. This gas circulation may be used for carrying out the reloading of the first area with loaded solid elements. For example, a container containing a stock of ammonia-loaded solid elements is connected for this purpose to the reloading orifice via a sleeve. The gas stream generated by the suction draws in the solid elements out of the container, these solid elements being transferred via the sleeve as far as the reloading orifice. The overpressure valve blocks the solid elements and prevents them from passing from the first area to the second area.

These and other features may be best understood from the following drawings and specification.

BRIEF DESCRIPTION OF THE DRAWINGS

Other features and advantages of the invention will become apparent from the detailed description which is given below, as an indication and by no means as a limitation, with reference to the appended figures, wherein.

DETAILED DESCRIPTION

Figure 1:
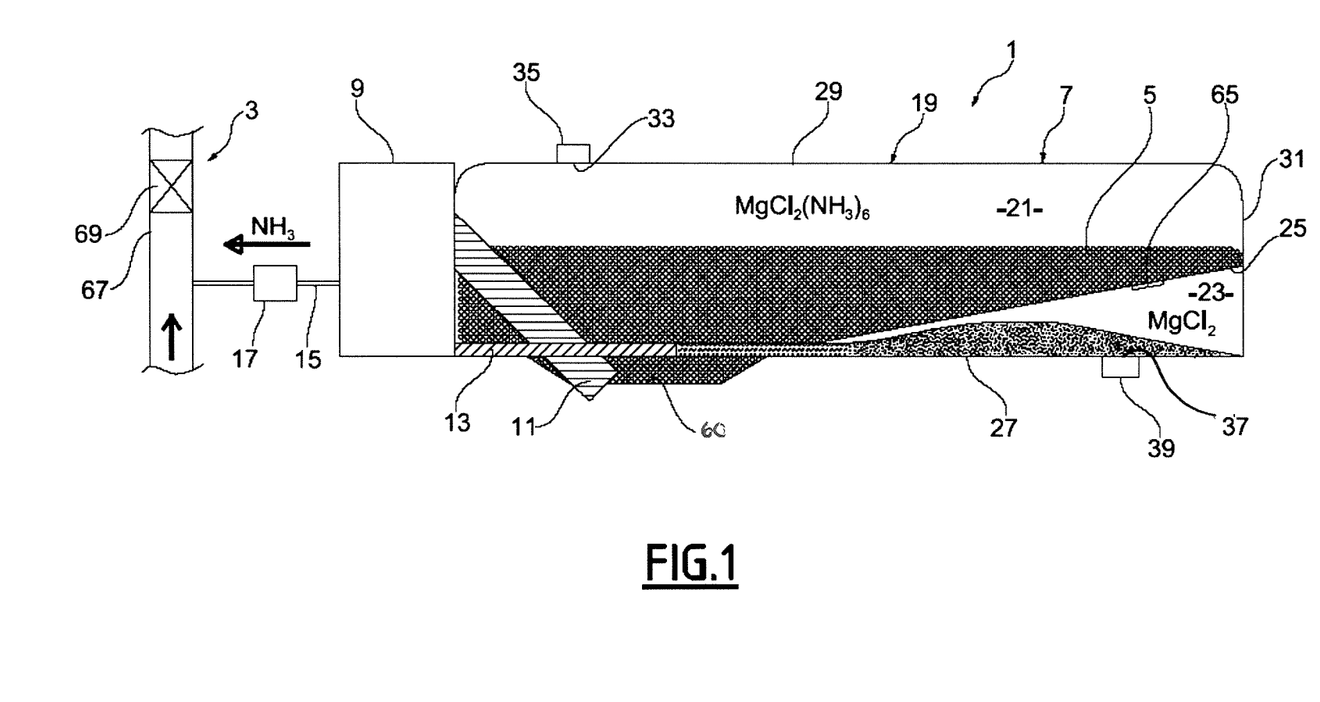
FIG. 1 is a schematic general illustration of the device for storing and supplying ammonia of the invention.

The device 1 illustrated in FIG. 1 is intended for storing ammonia and for supplying the exhaust line 3 with ammonia gas.

The device comprises:
- a solid material 5 capable of absorbing and desorbing ammonia;
- a reservoir 7 for storing the solid material 5;
- a heating unit 9 provided for heating the solid material to desorb ammonia;
- a first transfer assembly 11, provided for transferring the solid elements making up the solid material from the reservoir 7 to as far as the heating unit 9;
- a second transfer assembly 13, provided for transferring the depleted solid elements from the heating unit 9 to as far as the reservoir 7;
- a conduit 15 for supplying the exhaust line with ammonia, and a metering unit 17 inserted in the conduit 15.

The solid material comprises elements of small sizes, for example $MgCl_2$ tablets. Each tablet includes 1.5 grams of salt. It may absorb 1.5 grams of $NH_3$. Each $MgCl_2$ molecule may absorb six ammonia $NH_3$ molecules.

The reservoir 7 includes a shell 19 in plastic material, interiorly delimiting a volume for receiving the solid elements. The shell 19 is typically made by injection. It includes one or several plastic material layers, for example of polyethylene. The internal volume of the reservoir is divided into first and second areas 21, 23 by a flexible intermediate partition or wall 25. The first area 21 receives solid elements loaded with ammonia, called fresh solid elements in the description which follows. Alternatively, the intermediate wall 25 is rigid.

The second area 23 receives the depleted solid elements, i.e. the solid elements having given up all or part of their ammonia during the heating operation. The shell 19 has a lower bottom 27, provided for being turned downwards when the reservoir is mounted on the automobile vehicle, an upper bottom 29 and a side wall 31. The upper bottom 29 is provided in order to be turned upwards when the reservoir is attached to the vehicle. The side wall 31 connects the lower and upper bottoms 27 and 29 with each other.

The flexible partition 25 sealably separates both areas from each other. For example, the flexible partition 25 it extends from the lower bottom 27 to as far as the side wall 31.

The reservoir 7 further includes an orifice 33 for reloading the reservoir with fresh solid elements, made in the external shell 19, closed by a removable leakproof plug 35. The orifice 33 puts the first area 21 in communication with the outside. It is made in the upper portion of the reservoir, for example in the upper bottom 29.

The reservoir 7 further includes an orifice 37 for discharging the depleted solid elements, made for example in the lower bottom 27, and a removable plug 39 provided for sealably closing the discharged orifice 37. The orifice 37 puts the second area 23 in communication with the outside of the reservoir.

Figure 2:
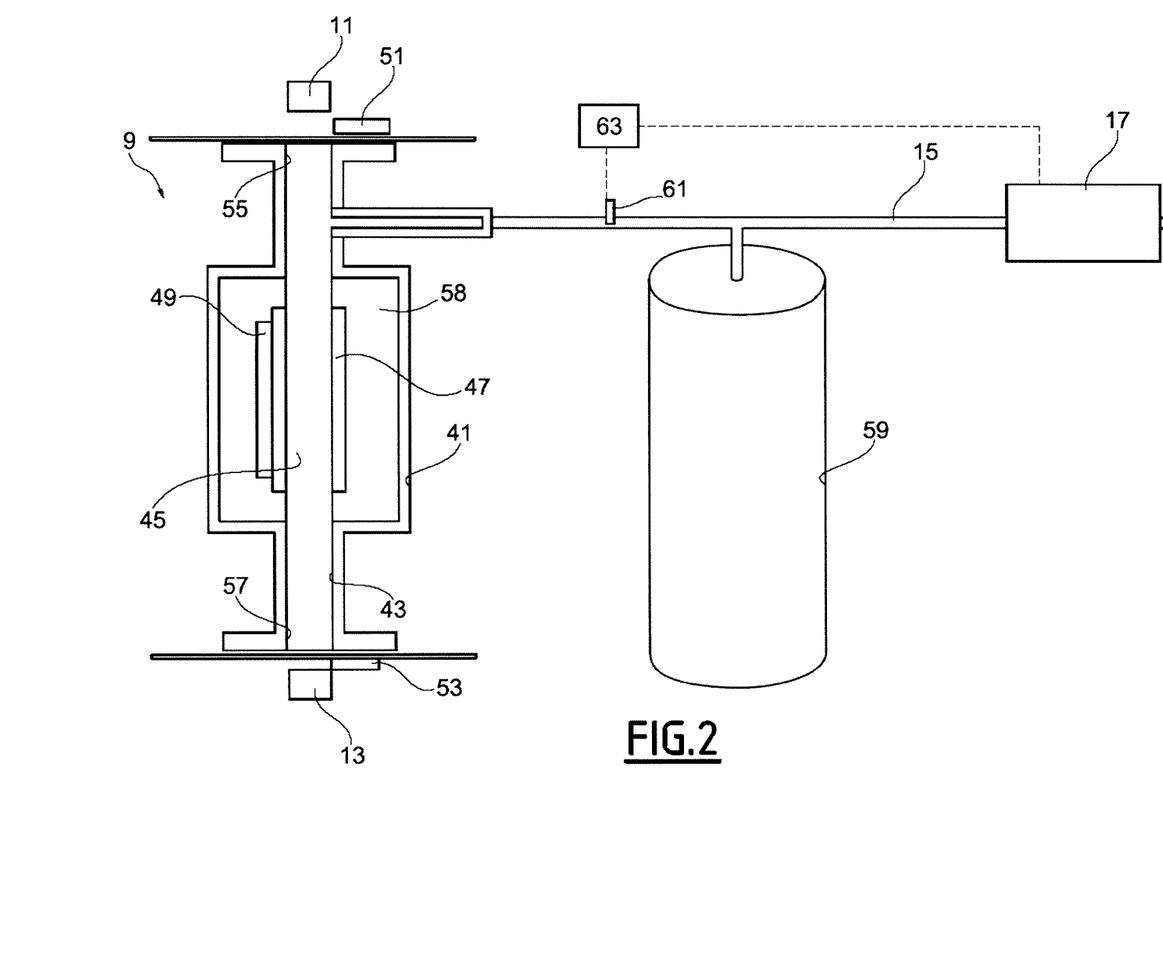
FIG. 2 is a schematic illustration of the heating unit and of the supply conduit of the device of FIG. 1.

The heating unit 9 is illustrated in more detail in FIG. 2. The heating unit 9 comprises a sealed enclosure 41 interiorly delimiting a passage 43 for the solid elements 45, a tubular metal sleeve 47 placed in the enclosure 41, around the passage 43, a heating member 49 and upstream and downstream obturation valves 51 and 53. The first transfer assembly 11 communicates with the passage 43 through an inlet 55 made in the sealed enclosure 41. This inlet 55 may be selectively obturated or cleared by the upstream valve 51.

The second transfer assembly 13 communicates with the passage 43 through an outlet 57 made in the enclosure 41. The outlet 57 may be selectively cleared or obturated by the downstream valve 53.

The channel 43 extends in a substantially rectilinear way from the inlet 55 to as far as the outlet 57.

In the exemplary embodiment illustrated in FIGS. 1 and 2, the solid elements are individually transferred one by one, from the reservoir into the heating unit. The heating unit 9 heats the solid elements one by one.

The heating unit 9 is laid out so that each solid element 45 transferred from the reservoir 7 by the first transfer assembly 11 stops inside the metal sleeve 47, as illustrated in FIG. 2. For example, the channel 43 is sloped, the inlet 55 being located at a level above the outlet 57. A stopping member not shown selectively blocks the solid element 45 in its sliding from the inlet towards the outlet, inside the sleeve 47.

The heating element 49 is an electric resistor, heating by conduction the metal sleeve 47. The metal sleeve 47 heats by conduction the solid element 45.

The heating member 49 is provided for heating a solid element to a temperature of about 420° C.

A layer 58 of high temperature thermal insulator is interposed between the sleeve 47 and the heating member 49 on the one hand, and the enclosure 41 on the other hand.

The first transfer assembly 11 comprises a worm screw. It is laid out for raising the solid element from a low point 60 made in the lower bottom 27 of the reservoir up to the inlet 55 of the enclosure of the heating unit. The low point 60 is located in the first area 21.

The second transfer assembly 13 also includes a worm screw, laid out for transferring the depleted solid elements from the outlet 57 of the enclosure to as far as the second area 23 of the reservoir.

The supply conduit 15 fluidically connects the channel 43 to the exhaust line. The metering unit 17 is provided for controlling the flow rate at which ammonia brought by the supply conduit 15 is injected into the exhaust line 3. The metering unit 17 for example includes a solenoid valve with an adjustable flow rate, or further an off/on solenoid valve with a sonic neck.

The device further includes a buffer reservoir 59, fluidically communicating with the supply conduit 15. The conduit 15 and the buffer reservoir 59 are continually in pressure equilibrium.

The buffer reservoir 59 is adapted for storing the amount of ammonia desorbed by the solid elements heated in the heating unit. It forms a reserve then allowing gradual supply of the exhaust line.

The device further includes a sensor or probe 61 for measuring the gas pressure in the supply conduit 15, and a computer 63 provided for controlling the whole of the storage and supply device. The computer 63 is informed by the pressure probe 61. The computer 63 controls the metering unit 17, the heating member 49, the upstream and downstream obturation valves 51 and 53, and the transfer assemblies 11 and 13. The computer 63 is, for example, the computer controlling the engine of the vehicle, or is a dedicated computer.

The flexible wall 25 is, for example, in an elastomer. It includes an overpressure valve 65. The valve 65 is calibrated to put the first and second areas 21, 23 in communication with each other when the first area is overpressurized by 100 millibars with respect to the second area.

The exhaust line 3 includes an exhaust conduit 67, in which is inserted a selected catalytic purification catalyst 69 (SCR).

The conduit 15 is provided for injecting ammonia gas in a point located upstream from the catalyst 69, the upstream area being understood here along the normal circulation direction of the exhaust gases, materialized by an arrow in FIG. 1.

The operation of the device for storing and supplying ammonia described above will now be detailed.

In the initial state, the storage and supply device 1 is rigidly attached to the automobile vehicle. The first area 21 of the reservoir is filled with fresh solid elements loaded with ammonia. The second area 23 of the reservoir is empty.

When the vehicle is running, the computer 63 controls the transfer of a solid element 45 from the first areas 21 to as far as the heating unit 9. The solid element is raised up by the worm screw up to the inlet 55 and slides along the channel 43 to as far as the interior of the metal sleeve 47. The computer 63 concomitantly orders the heating member 49 to heat the sleeve 47. The latter brings the temperature of the solid element 45 to 420° C., which causes desorption of almost the totality of the ammonia stored in the solid element 45 within a very short time interval. After introducing the solid element into the heating unit 9, the computer 63 orders the closing of the upstream and downstream valves 51 and 53. These valves obturate the inlet 55 and the outlet 57. The ammonia gas released by the solid element 45 flows into the supply conduit 15, fills the buffer 59 and flows to as far as the exhaust line. The metering unit 17 controlled by the computer 63 controls the flow rate of ammonia gas injected into the exhaust line 3.

Figure 3:
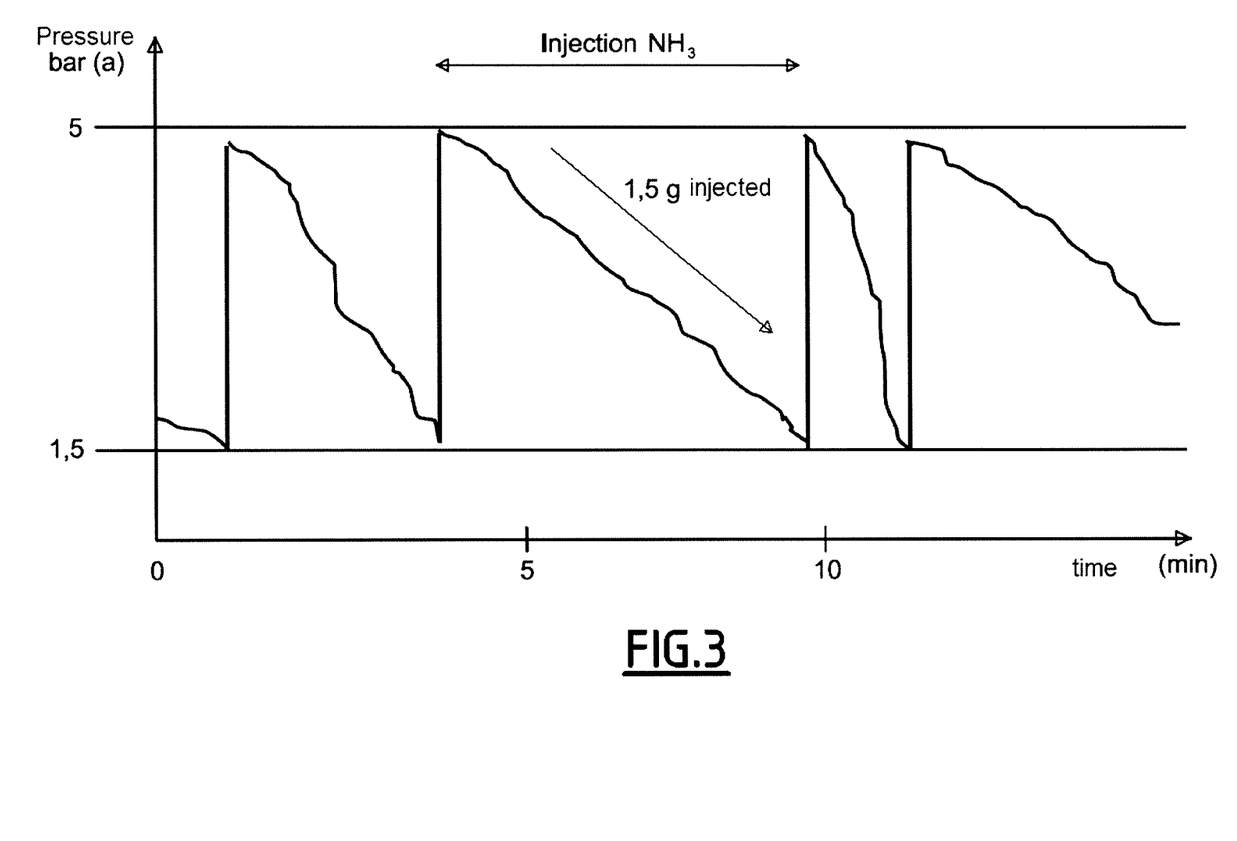
FIG. 3 is a graphical illustration of the time-dependent change of the ammonia pressure in the supply conduit of FIG. 2 as a function of time.

As visible in FIG. 3, immediately after having placed the solid element 45 in the sleeve 47 and having heated up this solid element, the pressure in the supply conduit 15 increases rapidly to a value slightly below 5 absolute bars. Gradually, as the ammonia gas is injected into the exhaust line, the pressure in the supply conduit 15 decreases. The computer controls the metering unit 17 so as to ensure a substantially constant flow rate of ammonia injected into the exhaust line 3.

When the pressure in the supply conduit 15 measured by the sensor 61 attains 1.5 absolute bars, the computer 67 orders discharge of the depleted solid element 45 out of the heating unit.

For this, it orders the opening of the upstream and downstream valves 51 and 53, and unblocks the solid element 45. The latter slides by gravity along the channel 43 as far as the outlet 57, and is driven by the second assembly for transfers 13 as far as into the second area 23 of the reservoir. Concomitantly, the computer orders the transfer of a second fresh solid element, from the first area 21 of the reservoir as far as into the heating unit 9. Once the second solid element is in place, the computer causes the closing of the upstream and downstream valves 51 and 53 so that the ammonia does not escape towards the reservoir 7. The heating of the second solid element very rapidly causes a new rise in the ammonia pressure in the supply conduit 15, as visible in FIG. 3.

Thus, the fresh solid elements are gradually transferred from the first area 21 into the heating unit 9, and, after depletion, from the heating unit 9 into the second area 23 of the reservoir. Periodically, it is therefore necessary to reload the reservoir with fresh solid elements.

Figure 4:
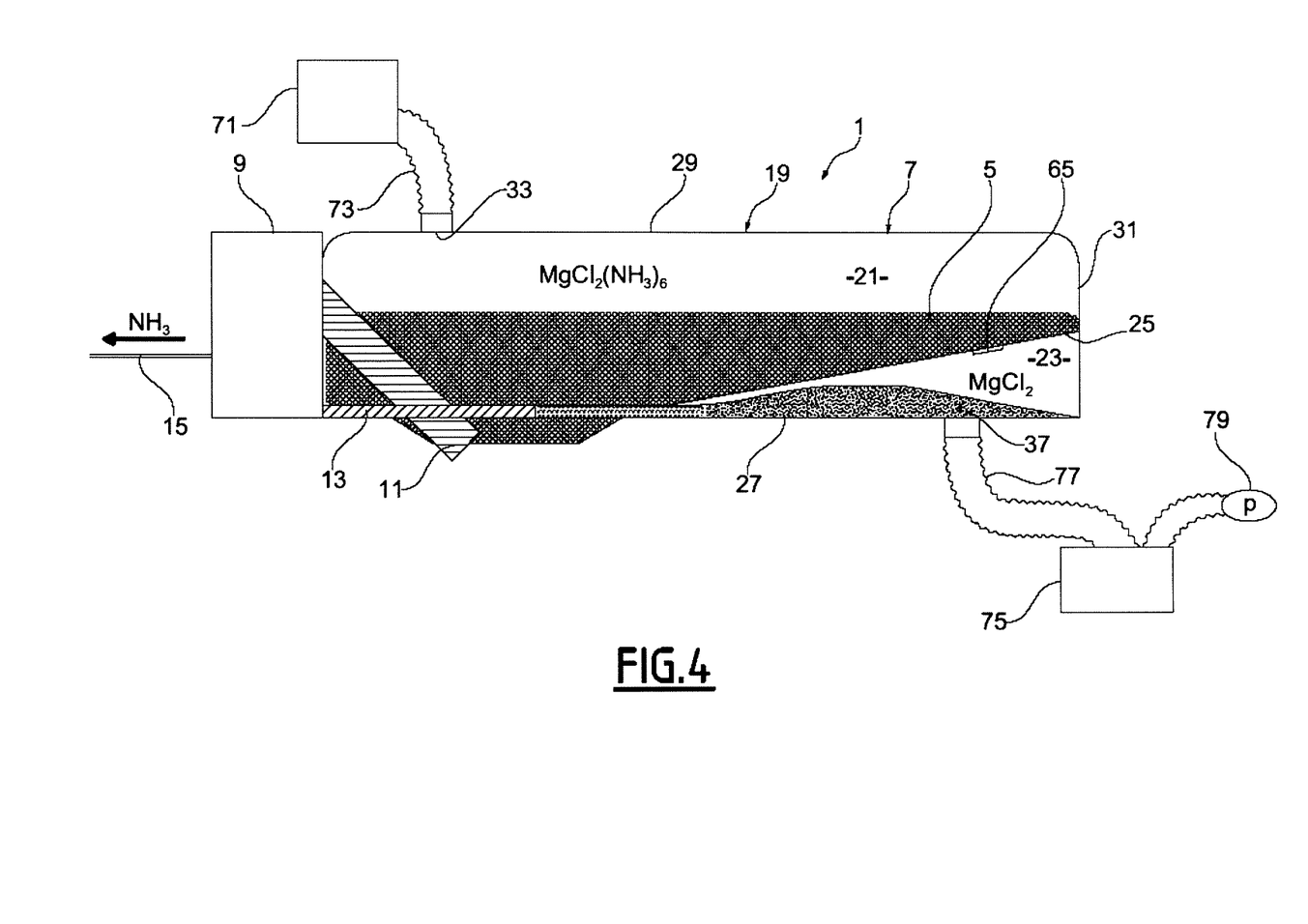
FIG. 4 is a schematic illustration similar to the one of FIG. 1, showing the principle for reloading the reservoir.

To do this, and as illustrated in FIG. 4, the plugs 35 and 39 obturating the orifices 33 and 37 are withdrawn. A container 71 loaded with fresh solid elements is connected to the orifice 33 by a sleeve 73. A reservoir 75 for collecting the depleted solid elements is connected to the discharge orifice 37 by another sleeve 77. This reservoir 75 is maintained depressurized via a depressurization member 79 such as a vacuum pump. Under the action of the vacuum pump, the depleted solid elements stored in the second area 23 are drawn in through the discharge orifice 37 and are led via the sleeve 77 up to the collecting reservoir 75. This has the effect of maintaining the second area 23 depressurized with respect to the first area 21 of the reservoir. The overpressure valve 65 opens when the pressure difference between both areas exceeds the calibration value, so that both areas are put into communication. The first area 21 is also itself depressurized, so that the fresh solid elements stored in the container 71 are drawn in through the sleeve 73 and the reloading orifice 33 as far as into the first area 21. When the depleted solid elements are all discharged from the second area 23, and when the first area 21 is entirely reloaded with fresh solid elements, depressurization via the vacuum pump is stopped. The plugs 39 and 35 are again placed on the orifices 37 and 33.

This is carried out without disassembling the reservoir of the automobile vehicle.

Alternatively, the reloading and discharge orifices 33 and 37 are concentric. They are obturated by a single plug. According to another alternative, the reloading and discharge orifices 33 and 37 are next to each other and are obturated by a single plug.

The internal volume of the reservoir is, for example, 12 liters. The volume of the buffer reservoir 59 is, for example, 40 centiliters.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A device for storing and supplying ammonia for an exhaust line of an automobile vehicle, the device comprising:
    a solid material provided for absorbing ammonia, the solid material comprising solid elements with a mass of less than 50 grams;
    a reservoir for storing the solid material;
    a heating unit to heat the solid material to desorb the ammonia, the heating unit being insulated from the reservoir;
    a first assembly to transfer the solid elements from the reservoir to the heating unit;
    a supply conduit fluidically connecting the heating unit to an exhaust line; a probe that measures a pressure in the conduit; and a computer programmed to order a discharge of depleted solid element(s) from the heating unit to as far as a storage area and the transfer of one or several other solid elements from the reservoir to as far as the heating unit depending on the pressure of ammonia in the supply conduit.

2. The device according to claim 1, wherein the heating unit is laid out for heating a mass of solid elements of less than 30 grams.

3. The device according to claim 1, including a buffer reservoir fluidically connected to the supply conduit.

4. The device according to claim 1, wherein the heating unit comprises an enclosure that receives one or several solid elements, and a heating member for heating by conduction.

5. The device according to claim 4, wherein the heating unit comprises a metal member positioned in the enclosure and in the contact of which the one or more solid elements are placed, the heating member being laid out for heating the metal member.

6. The device according to claim 1, wherein the reservoir comprises first and second areas sealably separated from each other, ammonia-loaded solid elements being stored in the first area, ammonia-depleted solid elements being stored in the second area, the first transfer assembly being laid out for transferring the solid elements of the first area to the heating unit, the device comprising a second transfer assembly laid out for transferring the solid elements from the heating unit to as far as the second area.

7. The device according to claim 6, wherein the reservoir comprises a deformable wall separating the first and second areas from each other.

8. The device according to claim 6, wherein the reservoir comprises a safety valve provided for putting the first and second areas in communication with each other when the first area is overpressurized with respect to the second area.

9. The device according to claim 6, wherein the reservoir comprises an orifice provided to reload the first area with solid elements.

10. The device according to claim 6, wherein the reservoir comprises an orifice provided to discharge the depleted solid elements out of the second area.

11. The device according to claim 1, wherein the reservoir is in a plastic material.

12. The device according to claim 1, wherein the solid elements are in a salt selected from $MgCl_2$, $CaCl_2$ and $BaCl_2$.

13. An exhaust line of an automobile vehicle comprising:
   an exhaust conduit; and
   a device for storing and supplying ammonia to the exhaust conduit, the device comprising a solid material provided for absorbing ammonia, the solid material comprising solid elements with a mass of less than 50 grams, a reservoir for storing the solid material, a heating unit to heat the solid material to desorb the ammonia, the heating unit being insulated from the reservoir, a first assembly to transfer the solid elements from the reservoir to the heating unit, a supply conduit fluidically connecting the heating unit to an exhaust line; a probe that measures a pressure in the conduit; and a computer programmed to order a discharge of depleted solid element(s) from the heating unit to as far as a storage area and the transfer of one or several other solid elements from the reservoir to as far as the heating unit depending on the pressure of ammonia in the supply conduit.

14. A method for supplying an exhaust line with ammonia from a storage and supply device comprising a solid material provided for absorbing ammonia, the solid material comprising solid elements with a mass of less than 50 grams, a reservoir for storing the solid material, a heating unit to heat the solid material to desorb the ammonia, the heating unit being insulated from the reservoir, a first assembly to transfer the solid elements from the reservoir to the heating unit, a supply conduit fluidically connecting the heating unit to an exhaust line; a probe that measures a pressure in the conduit; and a computer programmed to order a discharge of depleted solid element(s) from the heating unit to as far as a storage area and the transfer of one or several other solid elements from the reservoir to as far as the heating unit depending on the pressure of ammonia in the supply conduit, the method comprising the following steps:
   transferring one or several solid elements from the reservoir into the heating unit;
   heating the solid element(s) and directing desorbed ammonia towards the exhaust line;
   discharging the one or more solid elements out of the heating unit when the solid elements are at least partly depleted; and
   transferring one or several other solid elements from the reservoir into the heating unit.

15. The method according to claim 14, including measuring ammonia pressure supplying the exhaust line, the solid elements being discharged from the heating unit when the ammonia pressure is less than a predetermined limit.

16. A method for maintenance of the storage and supply device including a solid material provided for absorbing ammonia, the solid material comprising solid elements with a mass of less than 50 grams, a reservoir for storing the solid material, a heating unit to heat the solid material to desorb the ammonia, the heating unit being insulated from the reservoir, a first assembly to transfer the solid elements from the reservoir to the heating unit, a supply conduit fluidically connecting the heating unit to an exhaust line; a probe that measures a pressure in the conduit; and a computer programmed to order a discharge of depleted solid element(s) from the heating unit to as far as a storage area and the transfer of one or several other solid elements from the reservoir to as far as the heating unit depending on the pressure of ammonia in the supply conduit, wherein the reservoir is normally rigidly attached to an automobile vehicle, ammonia-loaded solid elements being introduced into the reservoir while the reservoir is rigidly attached to the automobile vehicle.

17. The method according to claim 16, wherein the reservoir comprises first and second areas sealably separated from each other, ammonia-loaded solid elements being stored in the first area, ammonia-depleted solid elements being stored in the second are, the method further comprising
   introducing the ammonia-loaded solid elements into the first area through a reloading orifice made in the reservoir, and
   discharging the depleted solid elements out of the second area through a discharge orifice made in the reservoir, wherein both steps are achieved while the reservoir is rigidly attached to the automobile vehicle.

18. The method according to claim 17, wherein the introduction step and the discharge step are pneumatically carried out by putting the first and second areas in communication with each other and by connecting a depressurization member to the discharge orifice.

\* \* \* \* \*